United States Patent [19]

Hocker et al.

[11] 4,365,012

[45] Dec. 21, 1982

[54] LIGHT SENSITIVE RECORDING MATERIAL

[75] Inventors: Jürgen Hocker, Bergisch Gladbach; Erwin Ranz, Leverkusen, both of Fed. Rep. of Germany

[73] Assignee: Agfa-Gevaert Aktiengesellschaft, Leverkusen, Fed. Rep. of Germany

[21] Appl. No.: 222,085

[22] Filed: Jan. 2, 1981

[30] Foreign Application Priority Data

Jan. 4, 1980 [DE] Fed. Rep. of Germany ....... 3000167

[51] Int. Cl.³ .......................... G03C 5/24; G03C 1/52
[52] U.S. Cl. ..................................... 430/19; 430/332; 430/962; 430/338
[58] Field of Search ................. 430/962, 338, 19, 332; 528/353

[56] References Cited

U.S. PATENT DOCUMENTS 3,533,798 10/1970 Muller et al. ........................ 430/338
3,629,180 12/1971 Yoda et al. ........................... 528/353

Primary Examiner—Won H. Louie, Jr.
Attorney, Agent, or Firm—Connolly and Hutz

[57] ABSTRACT

The light sensitive recording material which is suitable for use as recording material in computers and oscillographs contains as light sensitive substance a photochromic film forming cyclic polyimide compound.

3 Claims, No Drawings

LIGHT SENSITIVE RECORDING MATERIAL

This invention relates to a light-sensitive recording material containing a cyclic polyimide as light sensitive compound.

Many processes are known in which light-sensitive organic substances are used for image recording. Some of these processes are based on photochemical rearrangements or reactions to produce a colour change. Such photochemical reactions or organic compounds have been summarized in, for example "Präparative organische Photochemie". (A. Schönberb, Springer Verlag 1958) and "Light-sensitive System" (J. Mosar, John Wiley and Sons, New York 1965).

They include, for example, the formation of monomethine dyes which occurs as a result of the photolysis of trihalogen methyl compounds in UV light in the presence of aromatic or heterocyclic compounds which are so constituted that their CH ring members are exceptionally reactive for condensation or diazo coupling.

The known systems are of only limited practical use since their sensitivity to light is generally insufficient.

The use of cyclic polyimides as light-sensitive compounds in recording materials has been disclosed in German Pat. No. 1,522385; German Offenlegungsschriften Nos. 1,961,373 and 1,955,751 and German Pat. Nos. 1,955,070 and 2,000,623. The low molecular weight structure of these known cyclic polyimides has proved to be a disadvantage. To prepare the photographic recording layers, the known polyimides must be embedded in binder. Low molecular weight polyimides tend to diffuse out of recording layers which contain binder, a characteristic which has a particularly deleterious effect on the storage stability of the recording materials.

The sensitivity of the recording materials to light is not sufficient for practical requirements. Moreover, the materials are unsuitable for use in computers and oscillographs, where they are required not only to have a relatively high sensitivity to light but also to undergo an image forming reaction which is reversible, i.e. the image produced must be capable of being extinguished so that the recording material can be used again.

It is an object of this invention to develop a recording material which contains a film forming photochromic compound having a sensitivity to light and photochromic properties which render it suitable for use as recording material in computers and oscillographs.

This invention relates to a light-sensitive recording material containing cyclic polyimides, characterised in that it contains, as light-sensitive substance, a compound corresponding to the formula

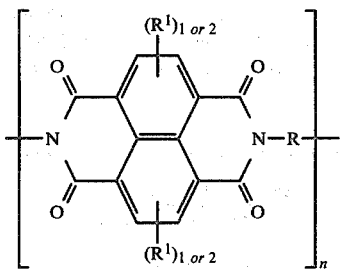

in which

R represents a divalent aliphatic group containing an electron donor function, $R^1$ represents hydrogen, halogen, $SO_3H$, CN, $COOR^2$, $N(R^3)_2$, $OR^4$ or $NO_2$;

$R^2$, $R^3$ and $R^4$ represents hydrogen or $C_1$–$C_6$ alkyl and n represents an integer from 2 to 1,000, preferably from 10 to 500, in particular from 10 to 200.

The group R is, in particular, a saturated or olefinically unsaturated group having up to 12 carbon atoms and containing at least one hetero atom such as oxygen, sulphur or $NR^2$ ($R^2$ as defined above,) in the main chain or in a side chain.

Particularly suitable for the purpose of the invention are those cyclic polyimides of the above formula in which $R^1$ represents hydrogen and the group R is derived from an alkylene triamine or an oxyalkylene diamino corresponding to the formula I or II:

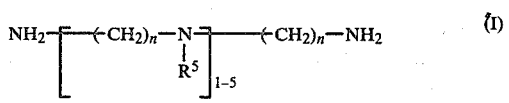

$R^5$ = H, alkyl, $CR^2O$
n = 1–4.

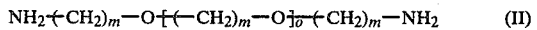

n = 1–4,
o = 0–2.

Particularly preferred are the reaction products of naphthalene-1,4,5,8-tetracarboxylic acid dianhydride with diethylene triamine, triethylene tetraamine or tetraethylene pentamine or their N-methyl derivatives provided that these contain two free amino end groups, or 1,4-bis-(3-aminopropyl) piperazine.

The polyimides used according to the invention may be prepared by known methods, which have been described in for example, Sorenson-Campbell, Präparative Methoden der Polymeren Chemie, published by Verlag Chemie Weinheim 1962; H. Lee, D. Stoffey, K. Neville, New Linear Polymers, McGraw-Hill Book Company, New York, San Francisco, Toronto, London, Sydney, 1967; or R. J. Cotter, M. Matzner, Ring-Forming Polymerizations, Organic Chemistry, Volume 13- B,2, Academic Press, New York, London 1972.

For example, naphthalene-1,4,5,8-tetracarboxylic acid dianhydride or naphthalene-1,4,5,8-tetracarboxylic acid in which the aromatic rings may already be substituted by the groups $R^1$, may be reacted with a diamine which releases the group R including the two nitrogen atoms. This reaction may be carried out in an organic solvent such as, for example, dimethyl formamide, N-methyl pyrrolidone, pyridine, formic acid, acetic acid, dimethyl sulphoxide, dimethyl acetamide or mixtures thereof. The reaction may also be carried out in the absence of a solvent. The water formed in the reaction may either be taken up by the solvent or removed by distillation. The reaction may also be carried out in two stages, in which the dicarboxylic acid and the diamine are converted to the amide acid in the first stage and to the polyimide in the second stage. The reaction is generally carried out with approximately stoichiometric quantities of the reactants and in most cases begins at temperatures in the range of about 0° C. to about 80° C. It is advisable to leave the reaction mixture at temperatures of about 80° to about 120° C. for some time after termination of the main reaction, in order to complete the reaction.

If the process is carried out in the presence of organic acids such as formic or acetic acid as solvent, the corresponding acylation products are obtained if the aliphatic chain R contains an NH function. If R contains an NR² function, the cyclic polyamides obtained may also be converted into the ammonium salts of inorganic or organic acids. These derivatives are water soluble and can be precipitated by the addition of bases.

The compounds described below together with their methods of preparation are examples of photochromic polyimides which are particularly suitable for recording materials according to the invention.

EXAMPLE OF PREPARATION 1, METHOD A

A solution of 4.15 parts by weight of bis-(2-aminoethyl)-amine in 50 parts by weight of pyridine is added dropwise at room temperature under nitrogen to a suspension of 100 parts by weight of dimethyl formamide, 50 parts by weight of pyridine and 10.72 parts by weight of naphthalene tetracarboxylic acid dianhydride. The reaction mixture is stirred for 4 hours at 100° C., cooled and suction filtered. 10 parts by weight of the polymer corresponding to the formula given below are obtained after drying at 50° C.

Analysis Calculated: C 64.48, H 3.91, N 12.53, O 19.08; Found: 63.2, 4.4, 11.9, 19.1.

IR (KBr): 1700, 1655 cm$^{-1}$($\nu$co).

NMR (CD$_3$COOD); $\delta$=8.83 ppm (4H), 4.8 ppm (4H), 3.9 ppm (4H).

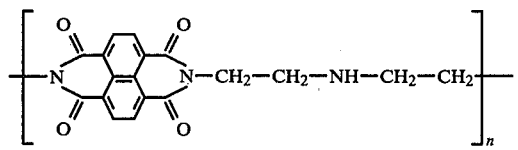

EXAMPLE OF PREPARATON 1, METHOD B

A solution of 4.15 parts by weight of bis-(2-aminoethyl)-amine in 50 parts by volume of pyridine is added at room temperature to a suspension of 10.72 parts by weight of naphthalene tetracarboxylic acid dianhydride in 150 parts by volume of acetic acid under nitrogen and the reaction mixture is heated to 100° C. for 5 hours. After cooling to room temperature, the reaction mixture is suction filtered to isolate 9.7 parts by weight of a polymer which is found to be the mono acetate of the polymer from Example 1A and shows an additional signal at $\delta$=2.25 ppm in the NMR spectrum.

EXAMPLE OF PREPARATION 2

A suspension of 100 parts by weight of dimethyl formamide, 50 parts by weight of pyridine and 10.72 parts by weight of naphthalene tetracarboxylic acid dianhydride is reacted with a solution of 5.25 parts by weight of bis-(3-aminopropyl)-amine in 50 parts by weight of pyridine by a method corresponding to that of Method A of Example 1. 14.9 parts by weight of a polymer corresponding to the following formula is obtained:

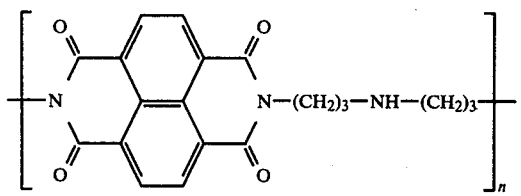

EXAMPLE OF PREPARATION 3

A suspension of 100 parts by weight of dimethyl formamide, 50 parts by weight of pyridine and 19.72 parts by weight of naphthalene tetracarboxylic acid dianhydride is reacted by a method corresponding to that of Method A of Example 1 with a solution of 8.16 parts by weight of butanediol-(1,4)-bis-(3-aminopropylether). 15 parts by weight of a polymer corresponding to the formula shown below are obtained:

Calculated: C 66.05, H 5.55, N 6.42, O 22.00; Found: 65.0, 5.8, 6.2, 22.6.

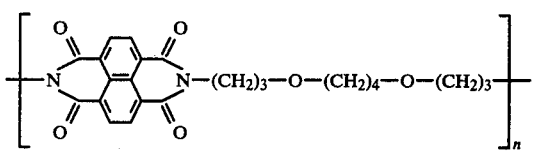

An identical polymer is obtained when the starting compounds are reacted by method 1B.

EXAMPLE OF PREPARATION 4

5.8 parts by weight of methyl-bis-(3-aminopropyl)-amine are reacted by a method corresponding to Method A of Example 1. 14.8 parts by weight of a polymer having the idealised structure indicated below are obtained.

Calculated: C 66.84, H 5.08, N 11.14, O 16.96; Found: 65.1, 5.2, 10.7, 17.9.

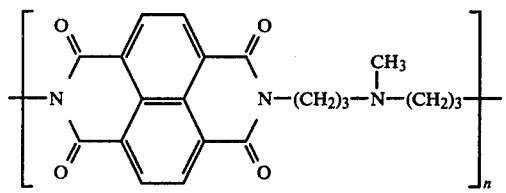

EXAMPLES OF PREPARATION 5-22

The following diamines and polyamines were reacted with naphthalene tetracarboxylic acid dianhydride by a method analogous to Method A of Example 1:

| Example Number: | | IR[cm$^{-1}$] | NMR[$\delta$/ppm] or analysis | |
|---|---|---|---|---|
| 5 | H$_2$N—(CH$_2$—CH$_2$—NH)$_x$—CH$_2$—CH$_2$—NH$_2$<br>x = 2 | 1700/1660 | 9,0 (4H), 4,85 (4H), 4,0 (8H) | |
| 6 | x = 3 | 1700/1655 | Calc. | C 62,7 H 5,52 N 16,64 O 15,21 |
| | | | Found | 59,9  5,6  15,3  16,5 |
| 7 | x = 4 | 1700/1660 | | |

| Example Number: | | IR[cm$^{-1}$] | NMR[δ/ppm] or analysis | | | | |
|---|---|---|---|---|---|---|---|
| 8 | H₂—(CH₂)₃—N—(CH₂)₃—NH₂<br>                       \|<br>                   (CH₂)₃—N(CH₃)₂ | 1710/1665 | Calc.<br>Found | C 66,80<br>66,25 | H 6,30<br>6,45 | N 12,48<br>12,65 | O 14,26<br>14,65 |
| 9 | H₂N—(CH₂)₃—N—(CH₂)₃—NH₂<br>                      \|<br>                (CH₂)₃—OC₄H₉ | 1705/1660 | 9,0 (4H), 4,6 (4H), 3,7 (10H), 2,5 (6H),<br>1,6 (4H), 0,95 (3H) | | | | |
| 10 | H₂N—(CH₂)₂—CH—(CH₂)₃—NH₂<br>                    \|<br>               N(CH₃)₂ | 1705/1660 | 9,0 (4H), 4,55 (4H), 3,65 (1H), 3,2 (6H)<br>2,15 (4H), 3,2 (6H), 2,45 (2H) | | | | |
| 11 | H₂N—(CH₂)₃—N—(CH₂)₃—NH₂<br>                     \|<br>               C₄H₉ | 1705/1660 | Calc.<br>Found | C 68,65<br>67,5 | H 6,01<br>6,15 | N 10,02<br>10,20 | O 15,26<br>15,15 |
| 12 | H₂N—(CH₂)₃—O—(CH₂)₂—O(CH₂)₃—NH₂<br>(nach Methode 1 B) | 1700/1660 | Calc.<br>Found | C 64,5<br>64,2 | H 4,92<br>5,05 | N 6,85<br>6,6 | O 23,5<br>24,1 |
| 13 | H₂N—CH₂—CH₂—S—CH₂—CH₂—NH₂ | 1700/1660 | | | | | |
| 14 | (H₂N—CH₂—CH₂—S—C₄H₈)₂O | 1705/1665 | | | | | |
| 15 | H₂N—⟨◯⟩—NH—(CH₂)₃—NH₂ | 1700/1660 | | | | | |
| 16 | [H₂N—CH—CH₂—NH—C—]₂<br>    \|               \|\|<br>    CH₃          O | 1700/1660 | Calc.<br>Found | C 60,8<br>59,8 | H 4,17<br>4,6 | N 12,9<br>12,2 | O 22,1<br>23,7 |
| 17 | [H₂N—(CH₂)₆—NH—C(=O)—CH₂—]₂ | | 9,0 (4H), 4,4 (4H), 3,6 (4H), 2,8 (8H)<br>1,4–2,2 (8H) | | | | |
| 18 | [H₂N—(CH₂)₃—O—(CH₂)₂—]₂O | 1705/1660 | Calc.<br>Found | C 63,7<br>63,5 | H 5,35<br>5,9 | N 6,19<br>6,15 | O 24,78<br>24,75 |
| 19 | [H₂N—(CH₂)₃—O—CH₂—]₂C(CH₃)₂ | 1700/1660 | Calc.<br>Found | C 66,66<br>66,55 | H 5,81<br>5,85 | N 6,22<br>6,25 | O 21,31<br>22,0 |
| 20 | [H₂N—(CH₃)₂—NH—CH₂—]₂ | 1705/1660 | | | | | |
| 21 | H₂N—(CH₂)₄—NH—(CH₂)₄—NH₂ | 1700/1660 | C 66,8<br>65,1 | H 5,06<br>5,55 | N 11,14<br>10,55 | O 16,97<br>17,6 | |
| 22 | H₂N—(CH₂)₃—N⟨piperazine⟩N—(CH₂)₃—NH₂ | 1705/1665 | | | | | |

EXAMPLE OF PREPARATION 23

14.25 parts by weight of methyl-bis-(3-aminopropyl)amine are reacted with 30.3 parts by weight of 2-chloronaphthalene tetracarboxylic acid dianhydride by a method corresponding to Method A of Example 1. 39.5 parts by weight of the polymer corresponding to the formula shown below are obtained.

Analysis Calculated: C 61.26, H 4.41, N 10.20, Cl 8.61; Found: 60.9, 4.5, 10.4, 8.9.

IR (KBr): 1705/1668 cm$^{-1}$ (νco).

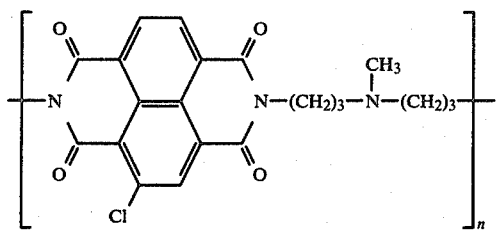

EXAMPLE OF PREPARATION 24

14.5 parts by weight of methyl-bis-(3-aminopropyl)amine are reacted with 31.3 parts by weight of 2-nitronaphthalene-tetracarboxylic acid dianhydride by a method corresponding to method A of Example 1. 43.2 parts by weight of the polymer corresponding to the following formula are obtained.

Analysis Calculated: C 59.71, H 4.30, N 13.37; Found: 60.1, 4.4, 13.7.

IR (KBr): 1708/1660 cm$^{-1}$ (νco).

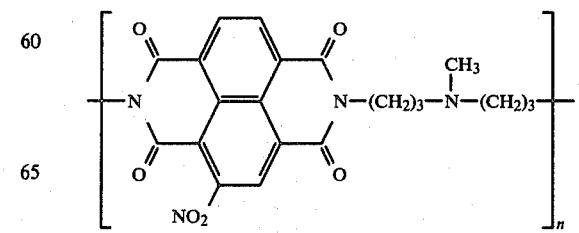

EXAMPLE OF PREPARATION 25

14.5 parts by weight of methyl-bis-(3-aminopropyl)amine are reacted with 31.2 parts by weight of naphthalene-pentacarboxylic acid dianhydride by a method corresponding to Method A of Example 1. 38.2 parts by weight of the polymer corresponding to the formula indicated below are obtained.

Analysis Calculated: C 62.70, H 4.55, N 9.97; Found: 63.0, 4.7, 10.2.

IR (KBr): 1704/1658 cm$^{-1}$ ($\nu$co).

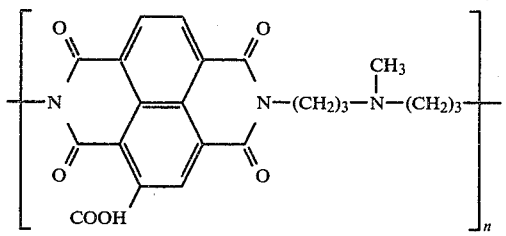

EXAMPLE OF PREPARATION 26

13.1 parts by weight of bis-(3-aminopropyl)-amine are reacted with 40.6 parts by weight of tetrachloronaphthalene-tetracarboxylic acid dianhydride by a method corresponding to Method B of Example 1. 52.5 parts by weight of the polymer corresponding to the formula below are obtained.

Analysis Calculated: C 47.93, H 2.62, N 8.39, Cl 28.30; Found: 47.6, 2.5, 8.7, 27.9.

IR (KBr): 1712/1664 cm$^{-1}$ ($\nu$co).

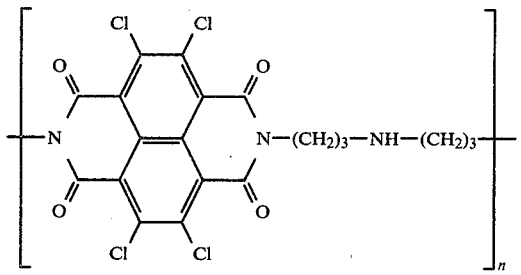

The sensitivity of the recording materials according to the invention extends from the ultraviolet to the visible region of the spectrum. UV lamps, mercury vapour lamps, halogen lamps, flash bulbs, etc. are therefore all suitable for exposure. The exposure time depends, of course, on the sensitivity of the light-sensitive compound and the distance of the light-sensitive material from the source of light. Exposure times ranging from 5 second to 1-2 minutes have generally proved sufficient. For most materials, 5 to 20 seconds is sufficient to produce a high quality, high contrast image.

The usual materials may be used as support layers, for the recording materials according to the invention, e.g. cellulose esters such as cellulose acetate or cellulose butyrate, polyesters, in particular those based on polyethylene glycol, terephthalates or polycarbonates, preferably those based on bis-phenyl alkanes, as well as paper, in particular baryta paper.

The support may be transparent or it may be coloured, preferably with dyes which provide a high contrast with the image areas of the recording layer.

When the light-sensitive compounds used in the materials according to the invention are exposed they give rise to coloured products which, when stored in the dark, revert more or less rapidly (times varying from a few minutes to several hours) to the colourless starting compounds.

The changing back of the coloured image substance into the colourless light-sensitive starting form can be greatly accelerated by heating. If the material carrying the image is heated to temperatures of from 60° to 100° C., the image disappears within a few seconds. The light-sensitive material remains completely ready for use and can be re-exposed immediately. In such layers, it is possible to extinguish certain parts of the information by controlled image-wise exposure of the image to infrared light.

For these reasons, the materials according to the invention are particularly important for those processes in which the image is required to be extinguished and the material re-used.

The photographic images obtained can be fixed by rendering the unexposed part of the cyclic polyimide insensitive to light. This may be achieved by, for example, the action of reagents which react with unsaturated double bonds. Suitable substances which react with unsaturated double bonds include, inter alia, halogens, such as bromine, chlorine or iodine, hydrohalic acids such as hydrogen chloride or hydrogen bromide, ozone, peroxi acids, hydrogen, sulfenyl chlorides, sulfur dichloride and potassium permanganate. Conversion of the light-sensitive cyclic polyimides into light insensitive compounds may also be achieved by dissolving the imide group, e.g. to form polyimide carboxylic acid by hydrolysis or polyamides by aminolysis. Exposed and unexposed parts of the light-sensitive cyclic polyimides may also be separated by selective dissolving out one of the components by means of a suitable solvent or solvents.

The photochromic polyimides described here have the advantage over known compounds of being film forming as polymeric compounds and therefore capable of being worked up into self-supporting photochromic foils. Another advantage of the present polyimides is their excellent sensitivity to light and the reversibility of the colour change produced by exposure to light. Both characteristics render the compounds suitable for use as recording materials of the type required in, for example, computers or oscillographs. Furthermore, the polyimides according to the invention give rise to homogeneous, virtually grain-free recording layers. The resulting advantages obtained when a transparent support layer is used for viewing the recording by transmitted light are obvious.

EXAMPLE 1

A 5% by weight solution in formic acid of the photochromic polyimide corresponding to Example of preparation 11, Method A, is cast on a baryta paper support so that, after drying, the support carries 5 g of the compound per m². The compound is film forming and forms a high gloss, slightly yellowish layer.

The sample is exposed to a high pressure mercury lamp at a distance of 20 cm.

A transparent grey step wedge in which the density changes by 0.15 units per step is placed in contact with the samples, between the source of light and the sample. After 5 minutes exposure, the sample turns brown behind a wedge density of up to 1.2 units (relative sensitivity 100). On exposure to direct sunlight, the sample discolors within a few seconds.

The spectral sensitivity passes through its maximum at 360 nm with trailers at 450 nm.

If the sample is stored in the dark at room temperature after exposure, the discoloration fades and is reduced by ca. 80 after 1 minute. When the exposed layer is heated to 80° C., the discoloration disappears after 2 to 3 seconds.

When the discoloration produced by the first exposure fades, the sample is again discolored by repeat exposure.

EXAMPLE 2

A 5% by weight solution in formic acid of the compound prepared by Example 4, Method B is cast on a metal surface which has been polished to a high gloss. The surface then carries 50 g of the compounds per m². The layer can be stripped off as a self-supporting foil. The color of the foil is slightly yellowish and on exposure to a high pressure mercury vapour lamp it discolors to a high contrast olive brown.

The relative sensitivity is 200 (determined as described in Example 1) and the spectral sensitivity corresponds to that of the polyimide prepared by Method A of Example 11. Approximately 80% of the dye formed on exposure disappears after storage in the dark for 5 minutes. When the discoloration produced by exposure has disappeared, the foil remains light-sensitive and can again be exposed.

EXAMPLE 3

The polyimide prepared according to Example 15, Method B and cast as indicated in Example 1 has both the relative sensitivity (100) and the spectral sensitivity of the polyimide corresponding to Example of preparation 11, Method A.

When a transparent photographic line or half-tone original is brought into contact with the recording layer and the layer is exposed to UV light through this original, positive brown line or half-tone copies of the original are obtained. These copies disappear completely after about 5 minutes storage in the dark at room temperature. Other photographic originals can then be copied on the layer. Extinction of the images can be accelerated by increasing the temperature as described in Example 1.

EXAMPLE 4

The polyimide described in the Example of preparation 20, Method B and cast as described in Example 1 changes from light brown to brown on exposure to UV light. The relative sensitivity, measured as described in Example 1, is 63 and the spectral sensitivity is the same as that of the polyimide prepared by Method A of Example 11. The dye formed on exposure to light disappears during storage in the dark in the same way as in the latter compound. The recording layer can then be re-exposed.

We claim:

1. A process for producing reversible images in a light-sensitive recording material which comprises the step of imagewise exposing to light, a supported layer containing a light-sensitive substance corresponding to the formula

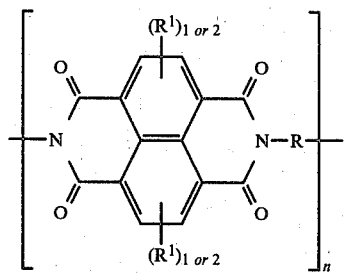

in which

R represents a divalent aliphatic group containing an electron donor function;

$R^1$ represents hydrogen, halogen, $SO_3H$, CN, $COOR^2$, $N(R^3)_2$, $OR^4$, or $NO_2$;

$R^2$, $R^3$, and $R^4$ represent hydrogen or $C_1$–$C_6$ alkyl and n represents an integer of from 2 to 1,000 and subsequently reverting said recording material to a monochromatic state.

2. A process for producing reversible images according to claim 1, wherein $R^1$ represents hydrogen and R is derived from an alkylene triamine corresponding to the formula

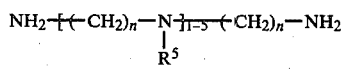

in which $R^5$ = H, alkyl or $CR^2O$ and n = 1–4.

3. A process for producing reversible images according to claim 1, wherein $R^1$ represents hydrogen and R is derived from an oxaalkylene diamine corresponding to the formula $$NH_2-CH_2)_m-O-(CH_2)_m-O](CH_2)_mNH_2$$

in which m = 1–4, and o = 0–2.

* * * * *